United States Patent [19]

Kohara et al.

[11] 4,326,777

[45] Apr. 27, 1982

[54] ELECTROCHROMIC DISPLAY DEVICE

[75] Inventors: Rikusei Kohara, Ibaraki; Susumu Kakumoto, Nagaokakyo; Takashi Aoyama, Ikeda; Masami Shoji, Takatsuki; Mutsuaki Shinagawa, Kawanishi, all of Japan

[73] Assignee: Matsushita Electric Industrial Co., Ltd., Kadoma, Japan

[21] Appl. No.: 96,478

[22] Filed: Nov. 21, 1979

[30] Foreign Application Priority Data

Nov. 25, 1978 [JP] Japan .................. 53-145458

[51] Int. Cl.$^3$ .......................... G02F 1/17; G02F 1/23
[52] U.S. Cl. ........................ 350/357; 252/600
[58] Field of Search ............... 252/408, 600; 350/357

[56] References Cited

U.S. PATENT DOCUMENTS

| | | | |
|---|---|---|---|
| 3,950,077 | 4/1976 | Jasinski | 350/257 |
| 4,018,508 | 4/1977 | McDermott et al. | 350/357 |
| 4,073,570 | 2/1978 | Korinek | 350/357 |
| 4,117,659 | 10/1978 | Takeshita | 350/357 |
| 4,187,003 | 2/1980 | Barclay | 252/408 |
| 4,212,518 | 7/1980 | Imataki et al. | 252/408 |

OTHER PUBLICATIONS

Chang, I. F., et al., IBM Tech. Discl. Bull., vol. 17, No. 4, p. 1050 (Sep. 1974).

*Primary Examiner*—Teddy S. Gron
*Attorney, Agent, or Firm*—Cushman, Darby & Cushman

[57] ABSTRACT

An electrochromic display device is disclosed including a cell container, a display electrode and a counter electrode both of a chemically stable conductor material. Also included in the container is an electrochromic aqueous solution composed of N,N'-di(p-cyanophenyl)-4,4'-bipyridinium dichloride, phosphoric acid and ammonium ferrous sulfate as a source of ferrous ions.

9 Claims, 1 Drawing Figure

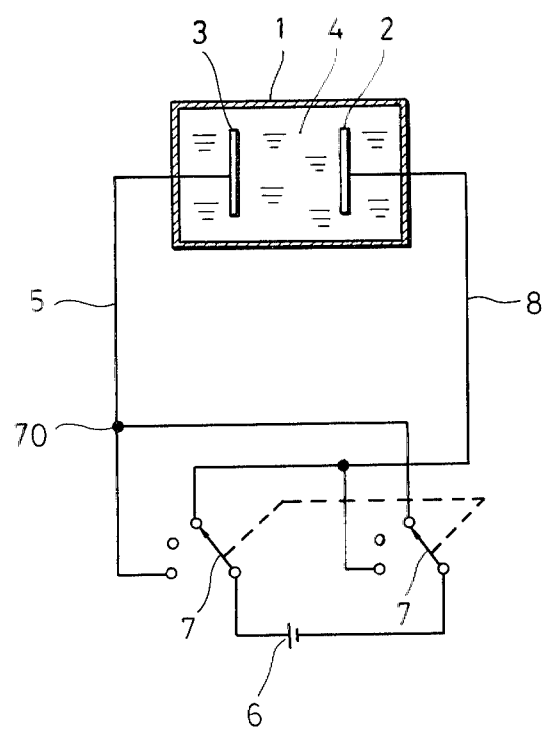

ELECTROCHROMIC DISPLAY DEVICE

BACKGROUND OF THE INVENTION

1. Field of the Invention

The present invention relates to an improvement of electrochromic display device of the type using an electrochemical redox reaction for the coloration and the bleaching reaction.

2. Prior Art

Recently, many kinds of an display devices which have been based on electrochemical phenomena have been developed and some of them are attracting attention in uses in the field of display. These device are generally called electrochromic display device and utilize electrochromism, namely, coloration and bleaching of a substance by means of the application of a voltage or current.

A typical construction of the electrochromic device comprises a cell having at least a transparent face and comprises a pair of electrodes and a liquid of an electrochromic substance in the cell, wherein by impression of predetermined electric signals across the electrodes, the colorations and bleachings are made and the state of the coloration lasts for a relatively long time period thereby attaining a memory function.

Generally speaking, the electrochromic substances are divided into solution type substances represented by a type using viologen compounds and dispersion type (solid-state) substances represented by a type using tungsten oxide. These two types are different in the physical nature of the coloration phenomena, but both uses use electrolyte substances. In order to obtain long life and stability of operation, the electrolytes should have physical, as well as, chemical stability. Especially, since the solution type electrochromic substance utilizes redox reactions for the coloration and bleaching reactions, the chemical stability of the liquid of electrochromic substance is strongly required.

SUMMARY OF THE INVENTION

The present invention can provide an electrochromic display device utilizing electrochemical redox reaction, wherein chemical stability of the electrochromic solution is improved by dissolving N,N'-di(p-cyanophenyl)-4,4'-bipyridinium dichloride in a solvent containing phosphoric acid.

BRIEF EXPLANATION OF DRAWING

The attached FIGURE shows a schematic sectional plan view of an electrochromic display device embodying the present invention, shown together with circuit connection of the relevant parts.

DESCRIPTION OF PREFERRED EMBODIMENT

An electrochromic display device in accordance with the present invention comprises
 a cell container having at least a transparent wall,
 at least a pair of electrodes made of a chemically stable conductor and disposed in said container,
 an electrochromic aqueous solution contained in said container and comprising N,N'-di(p-cyanophenyl)-4,4'-bipyridinium dichloride, phosphoric acid and a substance to produce ferrous ions.

In preferred embodiments, mol ratio of phosphoric acid to the substance to produce ferrous ions is preferably selected between 1 and 200, or more preferably between 3 and 50.

Further, in a preferred embodiment of the invention, 0.8-3, by means of ammonia water added a neutralizing reagent.

In the accompanying drawing, which shows a schematic sectional plan view of an electrochromic display device embodying the present invention shown together with circuit connection of the relevant parts, a display electrode 2 and a counter electrode 3 each of predetermined shapes and arrangements are disposed in a glass enclosure or container 1, in an insulated relation from each other, and an electrochromic aqueous solution 4 is confined in a manner such that the electrodes 2, 3 are immersed in the electrochromic aqueous solution. The container 1 can be made in a manner to have at least a transparent face or a transparent window on one wall of the cell. The electrodes 1, 2 are made of chemically stable conductor, such as noble metal, for example platinum or gold. The electrochromic aqueous solution 4 is a solution containing a viologen compound and phosphoric acid. In a modification of the device a third or auxiliary electrode for aiding the bleaching action can be provided if necessary. The electrodes 3 and 2 are connected through connection wires 5 and 8 and through polarity selection switch 7 to the terminals of a battery 6.

When a writing signal of a predetermined voltage is impressed across the display electrode 2 and the counter electrode 3 with such polarity that the display electrode 2 is negative and the counter electrode 3 is positive, a coloration is made on the display electrode 3. By impressing bleaching signal of the opposite polarity to the above writing signal, the coloration is erased.

For the viologen compound, N,N'-di(p-cyanophenyl)-4,4'-bipyridinium dichloride (hereinafter referred to as CPP) which is a N,N'-di-substituted p-cyanophenyl derivative of viologen is suitable.

EXAMPLE 1

Preferred contents of a first example of the electrochromic solution 4 are as follows:

$$\left[ \begin{array}{ll} \text{aqueous solution containing:} & \\ \text{CPP} & 0.01\text{-}0.02 \text{ mol/l} \\ \text{ammonium ferrous sulfate} & 0.01\text{-}0.5 \text{ mol/l} \\ \text{phosphoric acid} & 0.5\text{-}2.0 \text{ mol/l} \\ \left( \text{mol ratio of } \dfrac{\text{phosphoric acid}}{\text{ammonium ferrous sulfate}} \; 1\text{-}200 \right) & \end{array} \right]$$

The abovementioned range of the amount of CPP is for uniform coloration with a practical speed. The amount of CPP is less than 0.01 mol/l, the coloration speed is low. When the amount of CPP is more than 0.02 mol/l, there is no advantage of such an increase of CPP, but is waste of expensive CPP.

The ammonium ferrous sulfate is added to provide ferrous ions as an auxiliary redox system to the coloration reaction. The ferrous ions present effectively helps the reversible reaction by its reversible electrochemical reaction of $Fe^{++} \rightleftarrows Fe^{+++}$ in the solution. Theoretically, the coloration and bleaching reaction of CPP is made in the electrochemical redox reaction of the following formula (1):

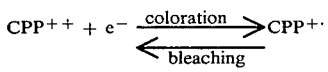

$$CPP^{++} + e^- \underset{\text{bleaching}}{\overset{\text{coloration}}{\rightleftarrows}} CPP^{+\cdot} \quad (1)$$

However, in fact, the reaction of the formula (1) is irreversible, and hence, the bleaching is not complete. Accordingly the coloring substance $CPP^{+\cdot}$ is retained on the display electrode 2. The inventors confirmed that, by an addition of the ferrous salt as auxiliary redox system in the bleaching reaction process, firstly $Fe^{+++}$ is produced by a reaction of the following formula (2):

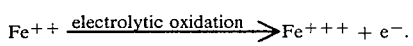

$$Fe^{++} \xrightarrow{\text{electrolytic oxidation}} Fe^{+++} + e^-. \quad (2)$$

Then, subsequently the $Fe^{+++}$ works to oxidize the retained colorating substance $CPP^{+\cdot}$ in a chemical oxidation as shown by the following formula (3), thereby completely bleaching the display electrode 2:

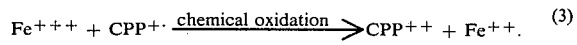

$$Fe^{+++} + CPP^{+\cdot} \xrightarrow{\text{chemical oxidation}} CPP^{++} + Fe^{++}. \quad (3)$$

Thus, by means of the reversible reaction of $Fe^{++} \rightleftarrows Fe^{+++} + e^-$, the coloration and bleaching reaction becomes completely reversible and complete.

The ferrous ions are added preferably in the form of Mohr's salt ($FeSO_4 \cdot (NH_4)_2SO_4$), and the suitable range of the amount of ammonium ferrous sulfate is 0.01–0.5 mol/l as listed above, and optimum amount is 0.04–0.5 mol/l. When the amount is less than 0.01 mol/l, the effect of the auxiliary redox system is insufficient. When the amount is more than 0.5 mol/l, the salt becomes supersaturated.

The phosphoric acid serves as chemical stabilizing agent for CPP and the ferrous salt and functions to prevent precipitation of insoluble compounds. As has been described, the ferrous salt is ionized in the solution and the ionized ferrous ions make the reversible redox reaction of $-Fe^{++} \rightleftarrows Fe^{+++} + e^-$. Since this reversible reaction includes electrolytic and chemical reactions, stabilizations of these reactions are necessary in order to obtain complete repetitions of the reversible redox reaction of CPP, or to attain a long life of the CPP display device. In the electrochemical electrochromic solution, insoluble precipitation is formed by an imbalance of the electrolytic reaction and the chemical reaction. In the phosphoric acid solution, the electrolytic reaction and the chemical reaction are well balanced, and therefore no precipitation is formed on the electrode. In other words, the reactions of the coloration and bleaching at the surface of the electrode are smoothly carried out on the working electrode. Furthermore, it has been observed that in the abovementioned electrochromic solution, which contains the phosphoric acid, no insoluble substance is produced even in such an environment such as to exposure of the solution to strong sun light, and the solution is stable.

Though details of the actual working mechanism of the phosphoric acid as the chemical stabilizer for CPP and ferrous salt in operation and function are not fully analized, it has been empirically confirmed that the concentration of the phosphoric acid and pH value of the electrochromic solution are important factors. For example, it can be speculated that the combination of the chemical nature per se and the pH of phosphoric acid would be impeding production of the insoluble compound such as $CPP^{++} \cdot Fe(OH)_4^{--}$. Accordingly, use of acids other than phosphoric acid in the pH adjusting provides no great advantage in the stabilization of the electrochromic solution. Especially, it has been empirically confirmed that acids other than phosphoric acid provide no advantage in suppressing the production of the insoluble compound under exposure to strong sun light.

Concentration of the phosphoric acid should be selected as high as possible under conditions so as not to form precipitation, responding to the amount of the ferrous salt. Through inventors' experimental studies, it has been found that 0.5 to 0.2 mol/l is suitable. Hence, the suitable ratio of the amount of phosphoric acid to the amount of a substance to produce the ferrous-ion is 1–200 in mol ratio, and the optimum ratio is 3–50 in mol ratio.

When the mol ratio of the phosphoric acid to the ferrous-ion-producing substance is less than 1, the precipitation is likely to occur; and when the mol ratio is larger than 200, the coloration becomes insufficient.

EXAMPLE 2

Another example of the electrochromic solution 4 is as follows:

aqueous solution containing:
| | |
|---|---|
| CPP | 0.01–0.02 mol/l |
| ammonium ferrous sulfate | 0.01–0.5 mol/l |
| phosphoric acid | 0.5–2.0 mol/l |
| mol ratio of $\dfrac{\text{phosphoric acid}}{\text{ammonium ferrous sulfate}}$ | 1–200 |
| ammonia water | in the amount to make the pH 0.8–3 |

The ammonia water contained in the electrochromic solution of this example is for pH adjusting. Other contents are the same as those of Example 1, and hence the corresponding descriptions apply. In case the electrodes 2, 3 are of a gold film formed by a vapor deposition or printing, the low pH value due to the phosphoric acid is not desirable for the stability of these electrodes. In such case, ammonia water is preferably added to adjust pH to the value of 0.8–3. For example, when the phosphoric acid is contained at the mol concentration of 1.5 mol/l, the pH value becomes 0.9. The value 0.9 is easily raised to 1.4 by adding the required amount of ammonia water. The amount of the ammonia water should be adjusted to obtain a pH value of 0.8–3 of the electrochromic solution. When the pH is higher than the value of 3, the coloration is not good, and the pH is lower than 0.8, the film-state electrode is likely to be damaged.

The inventors empirically found that use of an alkali substance other than ammonia water, for example, use of sodium hydroxide or potassium hydroxide as the pH adjusting agent, adversely destroys stabilization of the electrochromic solution, and results in production of an insoluble chemical compound.

What is claimed is:
1. An electrochromic display device comprising:
   a cell container having at least one transparent wall,
   a display electrode and a counter electrode of a chemically stable electrical conductor, and disposed in said container,
   an electrochromic aqueous solution comprising:
      N,N'-di(p-cyanophenyl)-4,4'-bipyridinium dichloride, phosphoric acid in an amount to provide a pH for said solution, and ammonium ferrous sulfate as a source of ferrous ions present in said solution in an amount of from about 0.001 to about 0.5 mol per liter, wherein the pH of said solution is in the range of about 0.8 to about 3.

2. The electrochromic device of claim 1 wherein the mol ratio of phosphoric acid to ammonium ferrous sulfate is between 1 and 200.

3. The electrochromic device of claim 2 wherein the mol ratio is between 3 and 50.

4. The electrochromic device according to claim 1 wherein said electrochromic solution also contains ammonia water present in an amount to provide said required pH range.

5. The electrochromic device of claim 1 or 2 wherein the electrochromic aqueous solution contains ammonium ferrous sulfate in an amount of from about 0.04 to about 0.5 mol per liter.

6. The electrochromic device of claim 1 or 2 wherein the concentration of said bipyridinium dichloride is in the range of about 0.01 to about 0.02 mol per liter of said electrochromic aqueous solution.

7. The electrochromic device of claim 6 wherein the electrochromic aqueous solution contains ammonium ferrous sulfate in an amount of about 0.04 to about 0.5 mol per liter.

8. An electrochromic display device comprising:

a cell container having at least one transparent wall, a display electrode and a counter electrode of a chemically stable electrical conductor, and disposed in said container an electrochromic aqueous solution consisting essentially of:

(i) N,N'-di(p-cyanophenyl)-4,4'-bipyridinium dichloride present in an amount of from about 0.01 to about 0.02 mol per liter, (ii) ammonium ferrous sulfate as an auxiliary redox system to the electrochromic coloration reaction present in an amount of from 0.01 to about 0.5 mol per liter, (iii) phosphoric acid, to prevent formation of insoluble compounds, present in an amount of from 0.5 to 2.0 mol per liter, provided the mol ratio of phosphoric acid to ammonium ferrous sulfate is in the range of between 1 to 200, and (iv) ammonia water present in an amount to provide a pH to said aqueous solution in the range of about 0.8 to about 3.

9. The electrochromic display device of claim 8 wherein the mole ratio of phosphoric acid to ammonium ferrous sulfate is between 3 and 50.

* * * * *